No. 846,013. PATENTED MAR. 5, 1907
M. E. CUMMINGS.
COMPUTING MEASURE.
APPLICATION FILED JAN. 6, 1906.
2 SHEETS—SHEET 1.
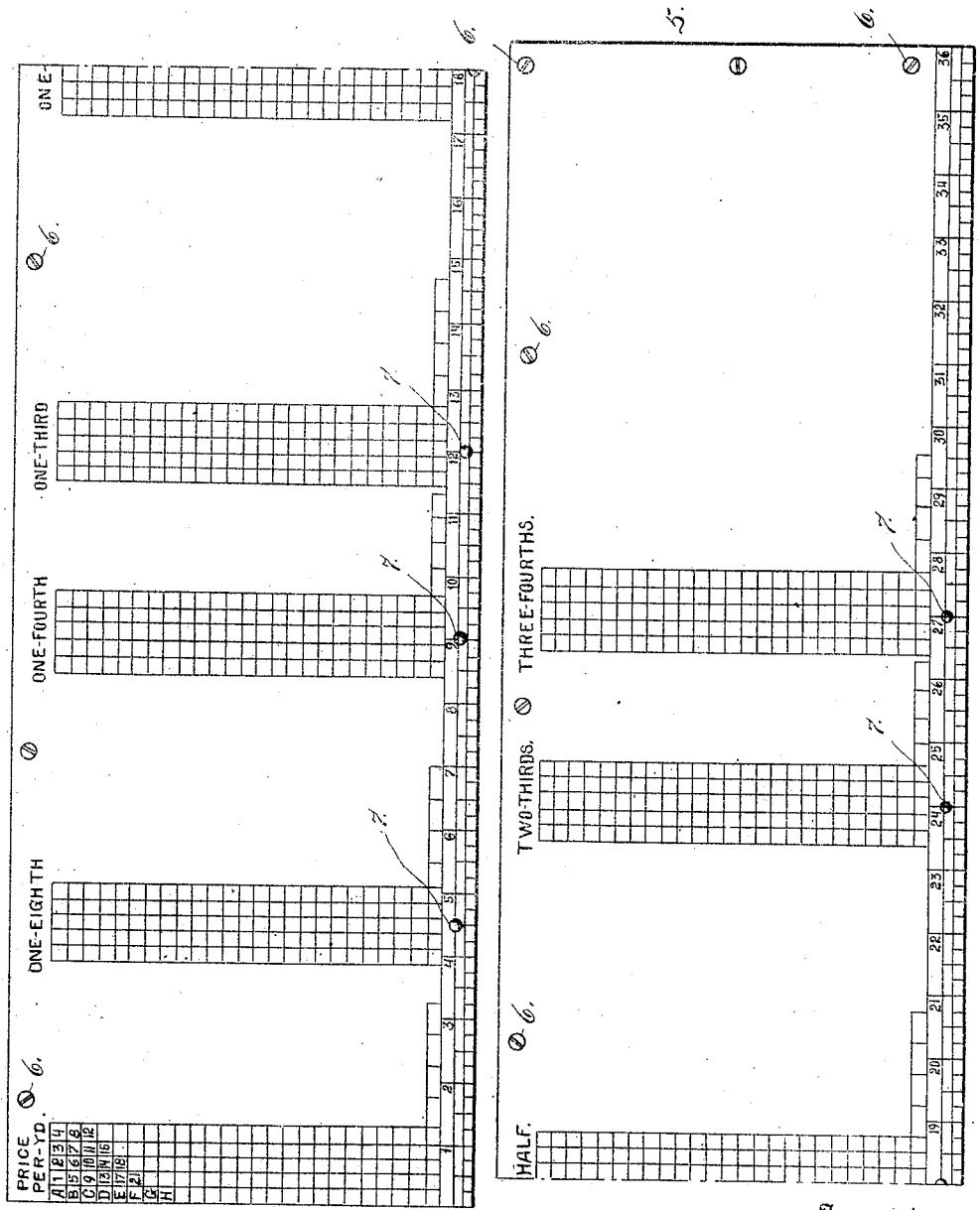

No. 846,013. PATENTED MAR. 5, 1907.
M. E. CUMMINGS.
COMPUTING MEASURE.
APPLICATION FILED JAN. 6, 1906.

2 SHEETS—SHEET 2.

UNITED STATES PATENT OFFICE.

MARTIN E. CUMMINGS, OF GREELEY, COLORADO, ASSIGNOR TO THE CUMMINGS MANUFACTURING COMPANY, OF GREELEY, COLORADO.

COMPUTING-MEASURE.

No. 846,013.　　　Specification of Letters Patent.　　　Patented March 5, 1907.

Application filed January 6, 1906. Serial No. 294,959.

*To all whom it may concern:*

Be it known that I, MARTIN E. CUMMINGS, a citizen of the United States, residing at Greeley, in the county of Weld and State of Colorado, have invented certain new and useful Improvements in Computing-Measures; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a computing-measure.

As shown in the drawing and hereinafter described it is my intention to have the measure one yard in length, since it is especially adapted for use in dry-goods stores where the yard is the unit of measure. This device is provided with a number of sections, one being a unit-price section and the others being fractional unit-price sections. Each one of these sections is divided into horizontal and vertical columns or rows of spaces. The left-hand vertical column of each section is provided with an index for ready reference. This index is preferably of the letters of the alphabet arranged in order in the said column. In the other spaces of the section are indicated different price-numerals to designate different prices per yard, the said prices being preferably arranged in regular order from one to one hundred, even higher, if desired. The other sections of the measure are located and designated to indicate fractions of a yard or other unit of measure. The spaces at the right of the index-column are provided with figures indicating the value of the fractional part of a yard corresponding with the general designation of the section, this value being computed at the price specified in the corresponding spaces of the unit-price section. The measure is preferably graduated to indicate inches from one to thirty-six where the unit of measure is the yard.

Having briefly outlined my improved construction, as well as the function it is intended to perform, I will proceed to describe the same in detail, reference being made to the accompanying drawing, in which is illustrated an embodiment thereof.

In this drawing, Figure 1 may be termed a "top plan view" of a portion of my improved computing-measure assuming that the same is applied to a horizontal surface. Fig. 2 is the other portion of the measure not shown in Fig. 1, the two views taken together indicating the complete measure shown on a small scale. Fig. 3 is a fragmentary view of a portion of the measure shown on a larger scale.

The same reference characters indicate the same parts in all the views.

Let the numeral 5 designate my improved computing-measure, which preferably consists of a plate of metal or other suitable material applied to a counter or other suitable support, (not shown,) whereby it will be conveniently located for use in a store where a computing device is required. As shown in the drawing, this measure is one yard in length, its base being graduated and numbered to indicate inches, while the measure beyond the base is provided with sections designated "Price per yard," "One-eighth," "One-fourth," "One-third," "One-half," "Two-thirds," and "Three-fourths," respectively. The price-per-yard section is divided into spaces arranged in horizontal and vertical columns, the horizontal columns being indicated by the letters of the alphabet placed in the extreme left-hand vertical column of spaces. The other spaces at the right of the index-column are provided with numerals indicating varying prices per yard or the length of a piece of goods corresponding with the length of the measure. These prices, as shown in the drawing, are numbered consecutively from "1" to "100" and are intended to designate cents. At the base of the section a number of other spaces are formed, extending toward the right and designating prices per yard in dollars. The general designations of the other sections, as heretofore explained, indicate fractions of a yard. These sections are divided into spaces corresponding with the spaces of the price-per-yard section and the horizontal columns are indicated in the same way. The other spaces contain figures indicating the computed cost of the fractions of a yard indicated by the general designations of the sections, estimated at the various prices per yard designated in the corresponding spaces of the price-per-yard section. Each fractional unit-section is provided at the base with a number of spaces extending toward the right corresponding with the spaces at the base of the unit-section, the said spaces at the base of the fractional section containing figures indicating the value of the various fractions of a unit computed at the price specified in the corresponding base-spaces of the unit-section.

In the drawing the numeral 6 designates fastening-screws, which it is assumed will be employed in securing the measure to a suitable stationary support. (Not shown.)

My improved computing-measure is preferably provided with buttons or rounded projections at its base located to indicate the fractional yard-marks corresponding with the titles of the fractional yard-sections.

Having thus described my invention, what I claim is—

1. A device of a given unit of length provided with price-sections, each containing a series of spaces arranged in horizontal and vertical columns, the horizontal columns being indexed for ready reference, one section being a price-per-unit section and the others being designated to indicate fractional units, the spaces adjacent the index-column of the price-per-unit section, containing the different prices for the unit of length of a piece of goods, and the corresponding spaces of each fractional unit-section having indicated therein the cost of a piece of goods of the length corresponding with the title of the fractional unit-section at the price set forth in the corresponding spaces of the price-per-unit section.

2. A computing-measure comprising a device of a given unit of length having its base graduated and provided with figures to indicate subdivisions of the linear unit, the said device being provided with a number of sections, each section being divided into spaces arranged in horizontal and vertical columns, the spaces of one section having placed therein figures to indicate various prices of articles of the unit of length; while the spaces of the other sections have placed therein figures to indicate the cost of goods of different fractional units of length estimated at the price set forth in the corresponding spaces of the price-per-unit section.

3. A computing-measure comprising a device of a given unit of length, the said device being provided with sections each divided into spaces arranged in columns perpendicular to each other, one section being a price-per-unit section, and the other sections being price-per-fractional-unit sections, the price-per-unit section having indicated in its spaces different prices for goods of a length equal to the unit of the measure; while the spaces of the other sections have indicated therein the price of different fractions of the unit estimated at the prices set forth in the corresponding spaces of the price-per-unit section.

4. A computing-measure comprising a device one yard in length and provided with sections each divided into spaces arranged in columns perpendicular to each other, the spaces of one section indicating in consecutive order a series of numbers indicating different prices per yard; while the spaces of the other sections indicate the cost of different fractions of a yard estimated at the price specified in the corresponding spaces of the price-per-yard section.

5. A computing yard-measure comprising a device a yard in length having its base suitably graduated to indicate fractions of a yard and having different sections divided into spaces, one section being suitably located and having in its spaces figures arranged in consecutive order to indicate the cost of goods at various prices per yard; the other sections being designated on the measure by titles to indicate different fractions of a yard and located on the measure adjacent the corresponding fractional marks, the spaces of the fractional yard-sections containing figures indicating the cost of the different fractions of a yard of goods estimated at the price found in the corresponding spaces of the price-per-yard section.

6. A computing yard-measure provided with sections divided into spaces arranged in horizontal and vertical columns, one section being located at the left-hand extremity of the measure and being designated "Price per yard," the horizontal columns or rows of spaces being designated by the letters of the alphabet arranged in their proper order, the various spaces of this section containing figures to indicate different prices per yard; the other sections being designated "One-eighth," "One-third," "One-half," "Two-thirds" and "Three-fourths," respectively and properly located on the measure to indicate the various yard-fractions indicated by their titles, the said fractional yard-sections being divided into spaces to correspond with the spaces of the price-per-yard section and correspondingly indexed, the spaces of the fractional yard-sections containing figures to indicate the cost of the different fractions of a yard estimated at the price set forth in the corresponding spaces of the price-per-yard section.

In testimony whereof I affix my signature in presence of two witnesses.

MARTIN E. CUMMINGS.

Witnesses:
 HARRY YOUNGS,
 LINCOLN FISHBACK.